United States Patent [19]

Blake

[11] Patent Number: 4,870,630

[45] Date of Patent: Sep. 26, 1989

[54] DESK WITH REMOVABLE PROGRAM PLAYING DEVICE

[76] Inventor: Paul Blake, 7 Colonial La., Canton, Mass. 02021

[21] Appl. No.: 124,244

[22] Filed: Nov. 24, 1987

[51] Int. Cl.⁴ ........................ H04R 5/02; G11B 33/02

[52] U.S. Cl. ........................................ 369/12; 312/7.1; 312/796; 369/10; 369/75.1

[58] Field of Search ........................ 369/12, 6, 7, 9, 10, 369/11, 75.1, 77.1, 69; 312/7.1, 196, 197, 198, 253, 254, 255, 256, 281, 8, 9, 10, 12; 206/305, 320; 220/4 R; 381/24, 88, 90, 188, 205; 181/145, 148, 150, 199; 455/347, 350; D14/168, 172, 214, 219; D6/396, 407, 414, 422, 457

[56] References Cited

U.S. PATENT DOCUMENTS

D. 255,234 6/1980 Wellward et al. .................. 181/150

1,731,096 10/1929 Erskine .............................. 312/196

4,187,395 2/1980 Hewson .............................. 381/24

4,388,492 6/1983 Sato ...................................... 381/24

*Primary Examiner*—Alan Faber

*Assistant Examiner*—Hoa T. Nguyen

*Attorney, Agent, or Firm*—H. Jay Spiegel

[57] ABSTRACT

Disclosed herein is a desk with a removable program playing device. As contemplated, the present invention includes desk structure including a plurality of drawers which may be utilized to store various items. At the rearwardmost portion of the desk, a pair of speaker grilles are provided which also include structure to releasably retain a program playing device in assembled relation with respect thereto with the speakers of the program playing device being contained within these speaker grilles.

7 Claims, 1 Drawing Sheet

FIG. 1
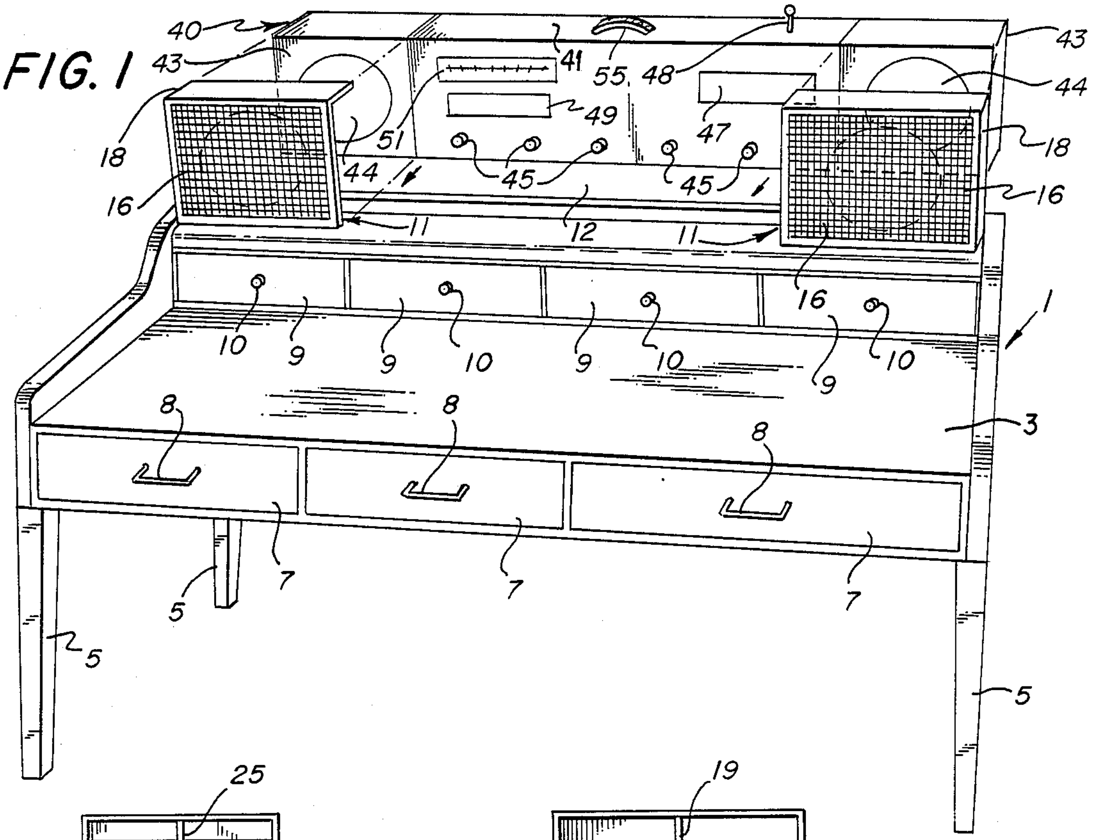
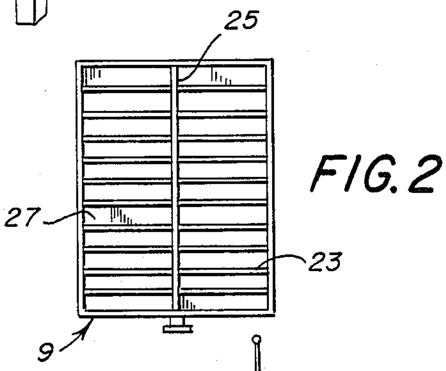
FIG. 2
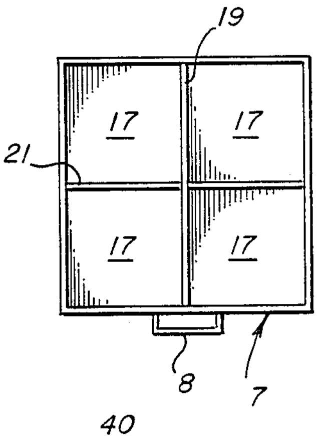
FIG. 3
FIG. 4
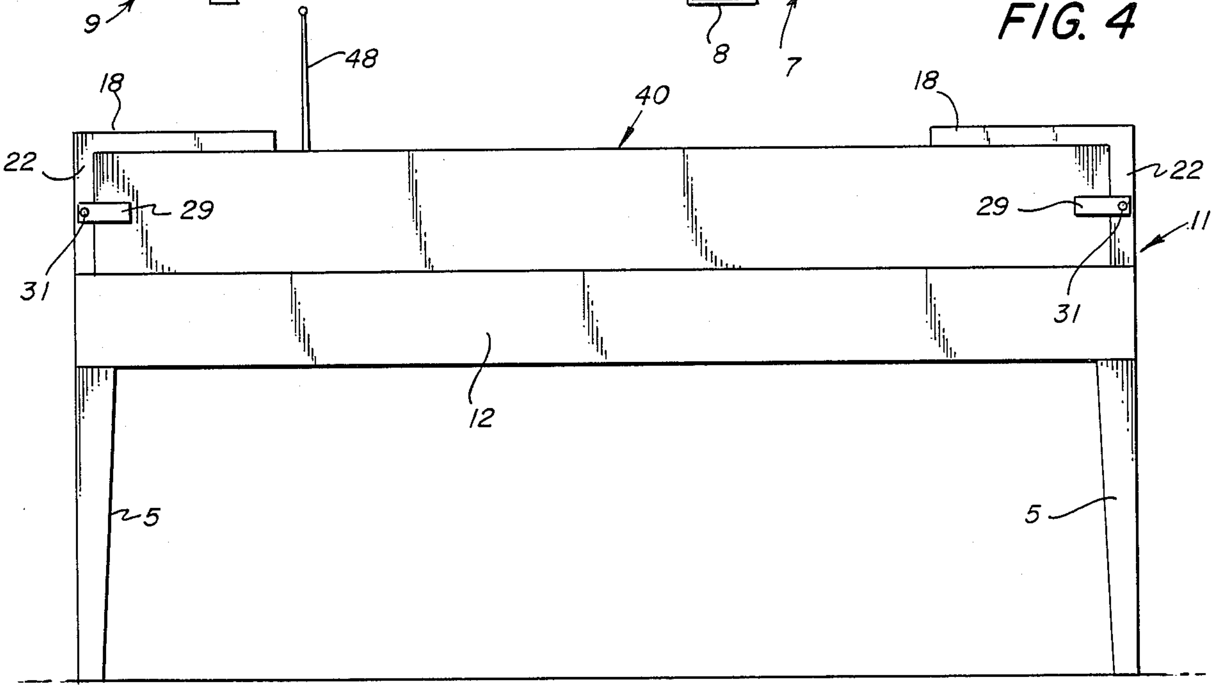

DESK WITH REMOVABLE PROGRAM PLAYING DEVICE

BACKGROUND OF THE INVENTION

In the prior art, it is known to provide a piece of furniture such as a bed or desk with a radio or record player incorporated therewith. In such devices, the included program playing device is permanently affixed to the furniture structure and is not usable if disconnected from the furniture structure. This is because speakers are permanently affixed to grille structures on the furniture, electrical wiring is attached to the inner surfaces of the furniture and the power supply is connected to the internal wiring contained within the furniture. As such, a need has developed for a new and improved piece of furniture which may include a program playing device which is detachably attachable thereto so that the program playing device may be utilized as attached to the piece of furniture or, alternatively, the program playing device may be removed from the article of furniture and may be utilized separately therefrom.

SUMMARY OF THE INVENTION

The present invention overcomes the deficiencies found in prior art devices and provides a new and improved article of furniture which includes a program playing device which is detachably attached thereto. The present invention includes the following interrelated aspects and features:

(a) In a first aspect, the present invention is preferably embodied in a desk having a classical eye-catching design. The desk includes a plurality of drawers which may be slidably moved with respect to the desk structure with these drawers including storage space therein.

(b) The above described drawers may include divider structure designed to divide the interior chamber of each drawer into a plurality of sub-chambers sized to removably receive program materials such as magnetic cassettes, laser discs and other such devices.

(c) At the rearwardmost portion of the desk, a pair of speaker grilles are provided on opposed sides thereof. The speaker grilles comprise upstanding members which may be covered with grille cloth and which may have attached thereto top and side walls giving the appearance from the front of the desk of enclosed chambers. These chambers, however, are open in directions facing one another so that a program playing device may be slid forward into engagement with the speaker grilles with the speakers of the program playing device inserted therein.

(d) In order to allow the program playing device to be firmly fixed in position on the inventive desk, a pair of latches are provided, one on each of the speaker grilles on a rearwardly facing surface thereof with these latches being designed in the preferred embodiment to pivot to a position allowing removal or insertion of the program playing device and may have a second position in which the latches are pivoted to lock the program playing device in assembly on the desk.

(e) The program playing device may have any known structure including an AM/FM stereo radio receiver, a digital disc player, a cassette player, a portable phonograph and the like. The program playing device has integrally formed therewith a pair of opposed speakers which are located so as to be hidden within the speaker grilles of the desk when the program playing device is installed thereon.

Accordingly, it is a first object of the present invention to provide an improved desk with removable program playing device.

It is a further object of the present invention to provide such an improved desk with structure allowing removal and attachment of a program playing device on the desk portion thereof.

It is a still further object of the present invention to provide such an improved desk with a plurality of drawers allowing removable storage of program playing materials.

These and other objects, aspects and features of the present invention will be better understood from the following detailed description of the preferred embodiments when read in conjunction with the appended drawing figures.

BRIEF DESCRIPTION OF THE DRAWINGS

FIG. 1 shows a perspective view of the present invention with the program playing device thereof shown removed therefrom in exploded fashion for clarity.

FIG. 2 shows a top view of one drawer of the present invention.

FIG. 3 shows a top view of another drawer of the present invention.

FIG. 4 shows a rear view of the present invention with the program playing device installed on the desk.

SPECIFIC DESCRIPTION OF THE PREFERRED EMBODIMENT

With reference first to FIG. 1, it is seen that the inventive device includes a desk 1 including a top 3 comprising a writing surface, legs 5, drawers 7 and 9 and a rear surface 12.

The drawers 7 include handles 8 allowing the drawers to be opened and closed while the drawers 9 include knobs 10 for the same purpose.

With reference to FIG. 2, it is seen that the drawers 9 preferably include a central divider 25 and a plurality of additional dividers 23 perpendicular to the central divider 25 with all of these dividers dividing the chamber formed by the drawer 9 into a plurality of sub-chambers 27 which, in the preferred embodiment, are sized to each receive a magnetic cassette device.

With reference to FIG. 3, it is seen that the drawers 7 have contained therein perpendicular partitions 19 and 21 which divide the chamber into four equal sub-chambers 17 each of which is preferably sized to removably receive a plurality of stacked digital discs.

With reference back to FIG. 1, it is seen that mounted on the surface 12 are a pair of speaker grilles 11 each of which includes a front grille portion having an opening therethrough (not shown) which is covered with grille cloth 16, a top 18 and a side wall 22. As best seen in FIG. 1, with particular reference to the left-hand speaker grille 11, the grilles 11 include no inner faces facing one another so that the program playing device 40 may be inserted from the rear into the grilles 11 and may rest on the surface 12.

With further reference to FIG. 1, it is seen that the program playing device 40 includes a central housing 41 having connected thereto at its outer edges a pair of housings 43 each of which has contained therein a program playing speaker 44. In the housing 41, several electronic components are contained including amplifier, pre-amplifier, circuit boards and other circuitry well known to those skilled in the art in this environment.

As schematically shown in FIG. 1, the central housing 41 has mounted therein control knobs 45 which may control balance, tone, volume, and which program playing device is activated. Furthermore, the housing 41 includes a magnetic cassette player 47, a digital disc player 49 and a tuning indicator 51 of an AM/FM stereo receiver device.

Furthermore, an antenna 48 is provided on the housing 41 to achieve optimum AM/FM reception.

With reference to FIG. 4, it is seen that at the rear of the side walls 22 of the speaker grilles 11, each speaker grille 11 has mounted thereon a latch mechanism 29 which is pivotally mounted on the wall 22 by virtue of a pivot pin 31. In the position shown in FIG. 4, the latch mechanisms 29 are pivoted to a position locking the program playing device 40 in assembled relation within the speaker grilles 11 and on the surface 12. If it is desired to remove the program playing device 40 from the desk 1, the latch mechanisms 29 are pivoted so that they are in overlying relation to the rear edge of the walls 22 to thereby allow the program playing device 40 to be removed therefrom. As should be understood from FIG. 1, with the program playing device 40 in assembled relation as shown in FIG. 4, the speakers 44 are closely adjacent the opening (not shown) covered by the grille cloth 16 covering the front surfaces of the speaker grilles 11.

Of course, as should be understood with reference to FIGS. 1-3, the drawers 7 and 9 may be utilized to store program playing materials which may be played on the various components of the program playing device 40.

Of course, various changes, modifications and alterations in the teachings of the present invention may be contemplated by those skilled in the art without departing from the intended spirit and scope thereof. For example, the desk 1 may be of a different configuration according to style or preference. Furthermore, the legs 5 may be replaced with a single central pedestal or other leg structures. Additionally, the program playing device 40 may take on any known form so long as it is sized and configured so as to be compatible with the structure of the desk which is designed to mesh therewith when the program playing device 40 is installed on the desk 1.

Again, various changes, modifications and alterations in the teachings of the present invention may be contemplated by those skilled in the art without departing from the intended spirit and scope thereof. Accordingly, it is intended that the present invention only be limited by the terms of the appended claims.

I claim:

1. An improved desk comprising:

(a) substantially flat writing surface;

(b) a support surface adjacent said writing surface;

(c) a pair of grille members mounted on said support surface on opposed sides thereof, each said grille member including:

(1) a face upstanding from said support surface and including an opening therethrough; and (2) said grille members being open in a direction facing one another; and (d) a program playing device having a housing with a bottom surface supported on said support surface, a pair of speakers on opposed ends of said housing placeable closely adjacent respective ones of said grille members, each speaker being substantially aligned with a respective said opening and control means on said program playing device located between said grille members when said program playing device is supported on said support surface, said program playing device being releasably attachable on said support surface.

2. The invention of claim 1, wherein said writing surface is separated from said support surface by a generally vertical surface supporting a plurality of drawers.

3. The invention of claim 1, wherein each said grille member includes a latch actuable between a first position locking said program playing device on said desk and a second said desk.

4. The invention of claim 1, wherein said desk includes a downwardly depending surface forward of said writing surface and supporting a plurality of drawers.

5. The invention of claim 1, wherein each said first face is covered with sound permeable fabric.

6. The invention of claim 3, wherein each said latch is located on a rear face of a said third outer face.

7. The invention of claim 1, wherein said program playing device includes a radio receiver, a tape player and a disc player.

* * * * *